(12) United States Patent
Han et al.

(10) Patent No.: US 12,075,517 B2
(45) Date of Patent: Aug. 27, 2024

(54) METHODS AND APPARATUSES OF HANDLING RADIO LINK FAILURE (71) Applicant: LENOVO (BEIJING) LIMITED, Beijing (CN)

(72) Inventors: Jing Han, Beijing (CN); Lianhai Wu, Beijing (CN); Haiming Wang, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 517 days.

(21) Appl. No.: 17/421,952

(22) PCT Filed: Jan. 16, 2019

(86) PCT No.: PCT/CN2019/072037
§ 371 (c)(1),
(2) Date: Jul. 9, 2021

(87) PCT Pub. No.: WO2020/147046
PCT Pub. Date: Jul. 23, 2020

(65) Prior Publication Data
US 2022/0117032 A1    Apr. 14, 2022

(51) Int. Cl.
*H04W 56/00* (2009.01)
*H04L 1/08* (2006.01)
*H04W 4/40* (2018.01)
*H04W 76/36* (2018.01)
*H04W 76/11* (2018.01)

(52) U.S. Cl.
CPC ............... *H04W 76/36* (2018.02); *H04L 1/08* (2013.01); *H04W 4/40* (2018.02); *H04W 76/11* (2018.02)

(58) Field of Classification Search
CPC ....... H04W 76/36; H04W 4/40; H04W 76/11; H04L 1/08
USPC .......................................................... 370/329
See application file for complete search history.

(56) References Cited

U.S. PATENT DOCUMENTS

| | | | |
|---|---|---|---|
| 8,830,818 | B2 | 9/2014 | Damnjanovic |
| 2014/0153390 | A1 | 6/2014 | Ishii et al. |
| 2018/0054804 | A1 | 2/2018 | Luo et al. |
| 2020/0145867 | A1* | 5/2020 | Tseng ................. H04B 7/06954 |
| 2020/0163005 | A1* | 5/2020 | Rao ......................... H04W 4/46 |

(Continued)

FOREIGN PATENT DOCUMENTS

| | | |
|---|---|---|
| CN | 104469827 A | 3/2015 |
| CN | 104540159 A | 4/2015 |

(Continued)

OTHER PUBLICATIONS

"Rayavarapu, Handling a Connection in a Wireless Communication System, Feb. 21, 2013, CA 2844630" (Year: 2012).*

(Continued)

*Primary Examiner* — Sai Ming Chan
(74) *Attorney, Agent, or Firm* — Kunzler Bean & Adamson (57) ABSTRACT

The present disclosure relates to methods and apparatuses for handling radio link failure. According to an embodiment of the present disclosure, a method includes: receiving a report of radio link failure (RLF) of a first sidelink communication between a first user equipment (UE) and a second UE; and releasing sidelink radio resource configuration, or transmitting information indicating release of radio resource configuration.

19 Claims, 10 Drawing Sheets

(56) References Cited

U.S. PATENT DOCUMENTS

| | | | |
|---|---|---|---|
| 2021/0195444 A1* | 6/2021 | Teyeb | H04W 24/04 |
| 2021/0204261 A1* | 7/2021 | Sharma | H04W 76/27 |
| 2021/0219112 A1* | 7/2021 | Shilov | H04W 72/0453 |
| 2022/0029691 A1* | 1/2022 | Yu | H04W 76/19 |
| 2022/0159599 A1* | 5/2022 | Hakola | H04W 56/0025 |

FOREIGN PATENT DOCUMENTS

| | | |
|---|---|---|
| WO | 2013181515 A2 | 12/2013 |
| WO | 2015136808 A1 | 9/2015 |

OTHER PUBLICATIONS

Internation Searching Authority, "Written Opinion of the International Searching Authority," PCT/CN2019/072037, Sep. 23, 2019, pp. 1-4.

* cited by examiner

METHODS AND APPARATUSES OF HANDLING RADIO LINK FAILURE

TECHNICAL FIELD

The subject application generally relates to a wireless communication system, and more particularly, to methods and apparatuses of handling radio link failure in the wireless communication system.

BACKGROUND

In a wireless communication system, one user equipment (or UE, e.g. mobile device) may communicate with another UE via a data path of an operator network. The data path of the network may include a base station (or BS) and gateways.

If an UE and another UE is relatively close to each other, radio link or sidelink can be established without going through a direct link to the BS to provide Device-to-Device (or D2D) communication. The term "sidelink" refers to a direct radio link for communication among devices, as opposed to communication via the cellular infrastructure (uplink and downlink) as discussed above. The "sidelink" is also referred to as a D2D link. D2D communication may be used in any suitable telecommunications network in accordance with various standards. The network may configure a resource pool that may perform the D2D operation to the UE.

D2D operation may provide various advantages, for example, a relatively high transfer rate, a relatively low delay, etc. Moreover, in D2D operation, traffic concentrated on a base station can be distributed. Furthermore, D2D UE may function as a relay to extend coverage of a base station.

D2D communication embodies vehicle-to- anything (or V2X) communication into the Long Term Evolution (LTE) sidelink. V2X communications encompass communications involving vehicles as message sources or destinations. In a New Radio (NR) communication system, unicast and groupcast are introduced into V2X communications. Access Stratum (AS) connection may be established to realize unicast or groupcast on sidelink.

A radio link or sidelink may fail due to various factors, for example but is not limited to blockage of building(s), relatively long distance between the UEs, blockage by moving object(s) (e.g., vehicle(s)), foliage (caused by seasonal changes), etc. Although Radio Resource Management (RRM) and Radio link Monitoring (RLM) have been developed based on AS level link management to maintain sidelink. However, RRM and RLM may not be sufficient to resolve the above problem. Therefore, a mechanism of reporting Radio Link Failure (RLF) and handling the RLF on sidelink is required.

SUMMARY OF THE DISCLOSURE

In accordance with some embodiments of the subject application, a method includes receiving a report of radio link failure (RLF) of a first sidelink communication between a first user equipment (UE) and a second UE and releasing sidelink radio resource configuration.

In accordance with some embodiments of the subject application, a method includes receiving a report of radio link failure (RLF) of a first sidelink communication between a first user equipment (UE) and a second UE and transmitting information indicating release of radio resource configuration.

In accordance with some embodiments of the subject application, a method includes detecting RLF of a first sidelink communication between a first UE and a second UE and transmitting a report of RLF.

In accordance with some embodiments of the subject application, a method includes detecting RLF of a first sidelink communication between a first UE and a second UE and releasing sidelink radio resource configuration.

In accordance with some embodiments of the subject application, an apparatus includes at least one non-transitory computer-readable medium having computer executable instructions stored therein. The apparatus further includes at least one receiver. The apparatus further includes at least one transmitter. The apparatus further includes at least one processor. The processor is coupled to the at least one non-transitory computer-readable medium, the at least one receiver and the at least one transmitter. The at least one non-transitory computer-readable medium and the computer executable instructions are configured, with the at least one processor, cause the apparatus to implement the above methods.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
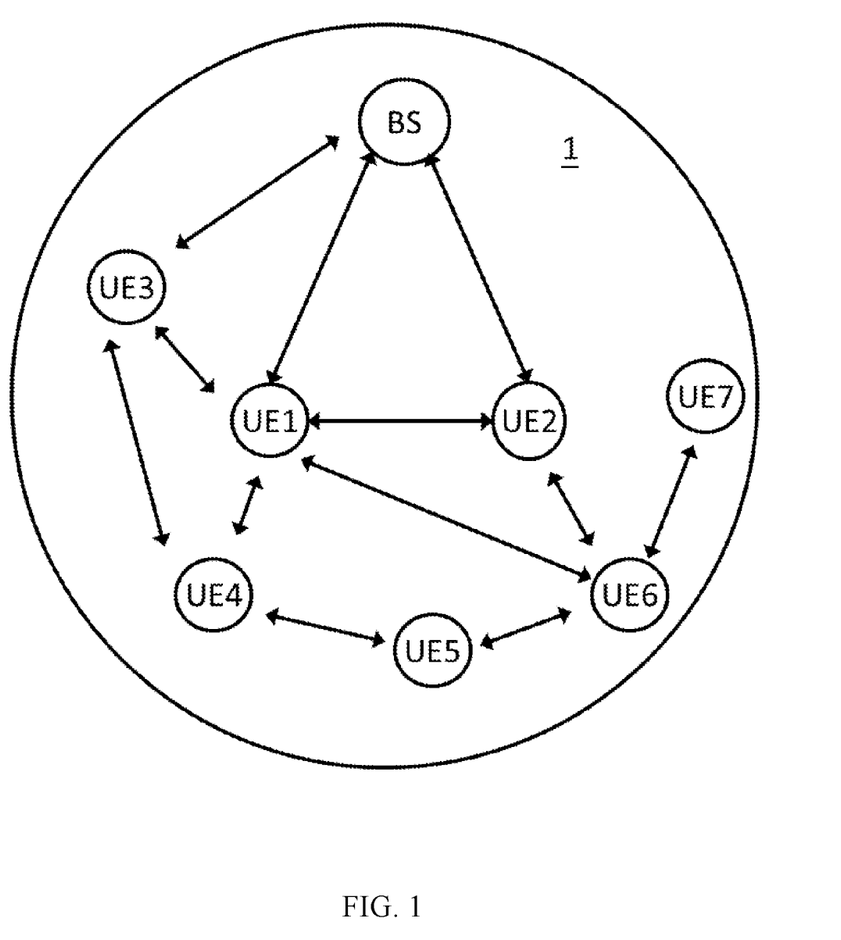
FIG. 1 illustrates a wireless communication system in accordance with some embodiments of the subject application.

FIG. 1 illustrates a wireless communication system 1 in accordance with some embodiments of the subject application.

Referring to FIG. 1, the wireless communication system 1 includes a base station BS, user equipment UE 1, user equipment UE 2, user equipment UE 3, user equipment UE 4, user equipment UE 5, user equipment UE 6 and user equipment UE 7. Although merely one base station is illustrated in FIG. 1 for simplicity, it is contemplated that wireless communication system 1 may include more base station(s) in some other embodiments of the subject application. Although merely UE 1, UE 2, UE 3, UE 4, UE 5, UE 6 and UE 7 are illustrated in FIG. 1 for simplicity, it is contemplated that wireless communication system 1 may include more or less UE in some other embodiments of the subject application.

BS may operate, for example but is not limited to, based on the standard protocol of Long-Term Evolution (LTE), LTE-Advanced (LTE-A), New Radio (NR), or other suitable protocol(s).

UE 1 may include, for example but is not limited to, a computing device, a wearable device, a mobile device, an IoT device, a vehicle having at least a transceiver, etc. Each of UE 2, UE 3, UE 4, UE 5, UE 6 and UE 7 may include device same or similar to UE 1. Each of UE 2, UE 3, UE 4, UE 5, UE 6 and UE 7 may include device different from UE 1. Persons skilled in the art should understand that as the technology develops and advances, the terminologies described in the present disclosure may change, and should not affect or limit principle and spirit in the present disclosure. Each of UE 1, UE 2, UE 3, UE 4, UE 5, UE 6 and UE 7 is within coverage of BS.

BS may resource schedule each of UE 1, UE 2, UE 3, UE 4, UE 5, UE 6 and UE 7 to perform transmission of data and information control during direct D2D or sidelink communication.

Each of UE 1, UE 2, UE 3, UE 4, UE 5, UE 6 and UE 7 itself may select a resource from a resource pool for D2D or sidelink communication during direct data transfer and direct information control.

Figure 2:
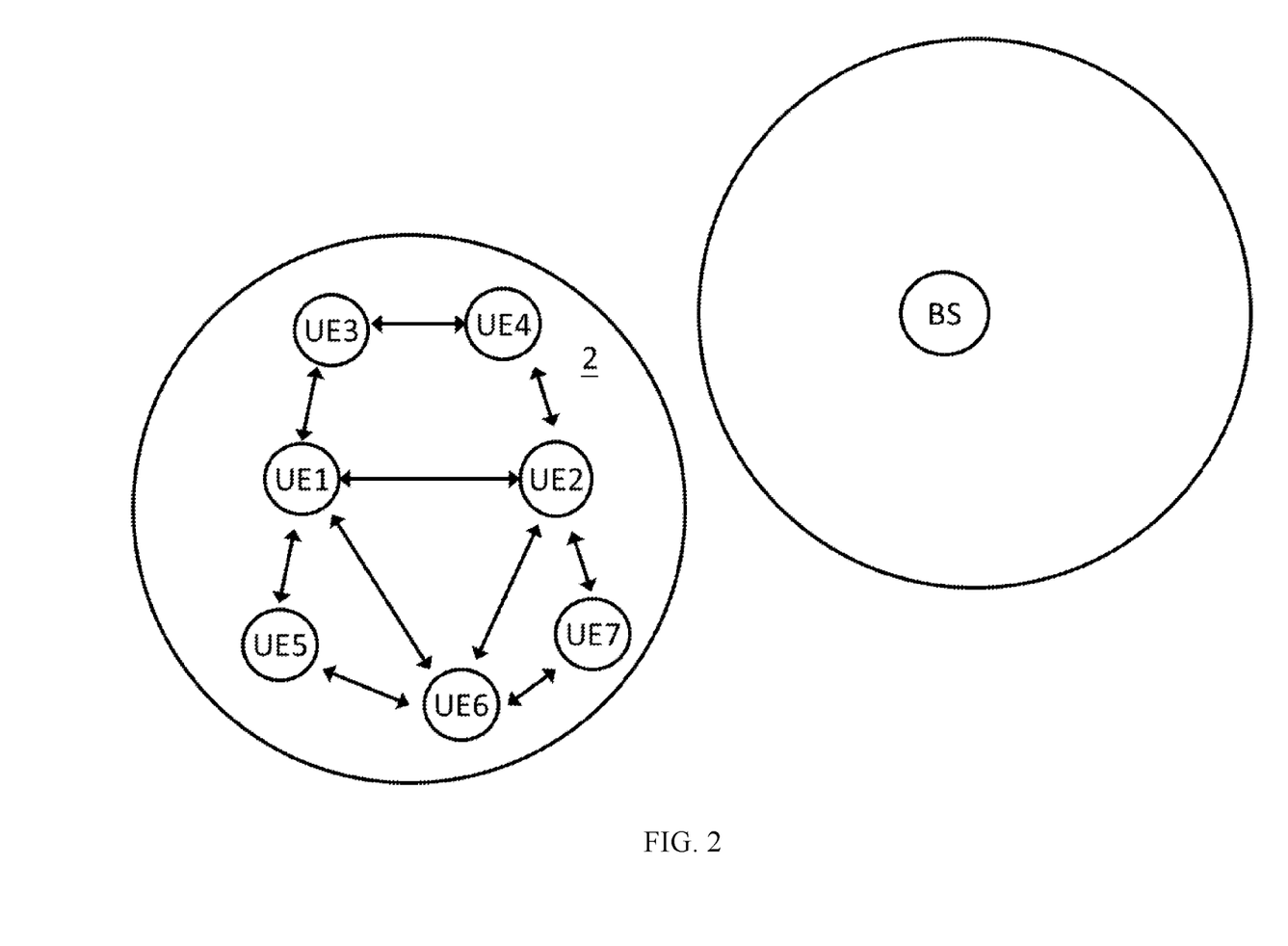
FIG. 2 illustrates another wireless communication system in accordance with some embodiments of the subject application.

FIG. 2 illustrates a wireless communication system 2 in accordance with some embodiments of the subject application.

Referring to FIG. 2, the wireless communication system 2 includes user equipment UE 1, user equipment UE 2, user equipment UE 3, user equipment UE 4, user equipment UE 5, user equipment UE 6 and user equipment UE 7. Although merely UE 1, UE 2, UE 3, UE 4, UE 5, UE 6 and UE 7 are illustrated in FIG. 2 for simplicity, it is contemplated that wireless communication system 2 may include more or less UEs in some other embodiments of the subject application.

UE 1 may include, for example but is not limited to, a computing device, a wearable device, a mobile device, an IoT device, a vehicle having at least a transceiver, etc. Each of UE 2, UE 3, UE 4, UE 5, UE 6 and UE 7 may include device same or similar to UE 1. Each of UE 2, UE 3, UE 4, UE 5, UE 6 and UE 7 may include device different from UE 1. Persons skilled in the art should understand that as the technology develops and advances, the terminologies described in the present disclosure may change, and should not affect or limit principle and spirit in the present disclosure. Each of UE 1, UE 2, UE 3, UE 4, UE 5, UE 6 and UE 7 is out of coverage of BS. The wireless communication system 2 is out of coverage of BS.

Because UE 1, UE 2, UE 3, UE 4, UE 5, UE 6 and UE 7 are out of coverage of BS, BS may not schedule resource for each of UE 1, UE 2, UE 3, UE 4, UE 5, UE 6 and UE 7 to perform sidelink communication.

Each of UE 1, UE 2, UE 3, UE 4, UE 5, UE 6 and UE 7 itself may select a resource from a resource pool for D2D or sidelink communication.

Figure 3:
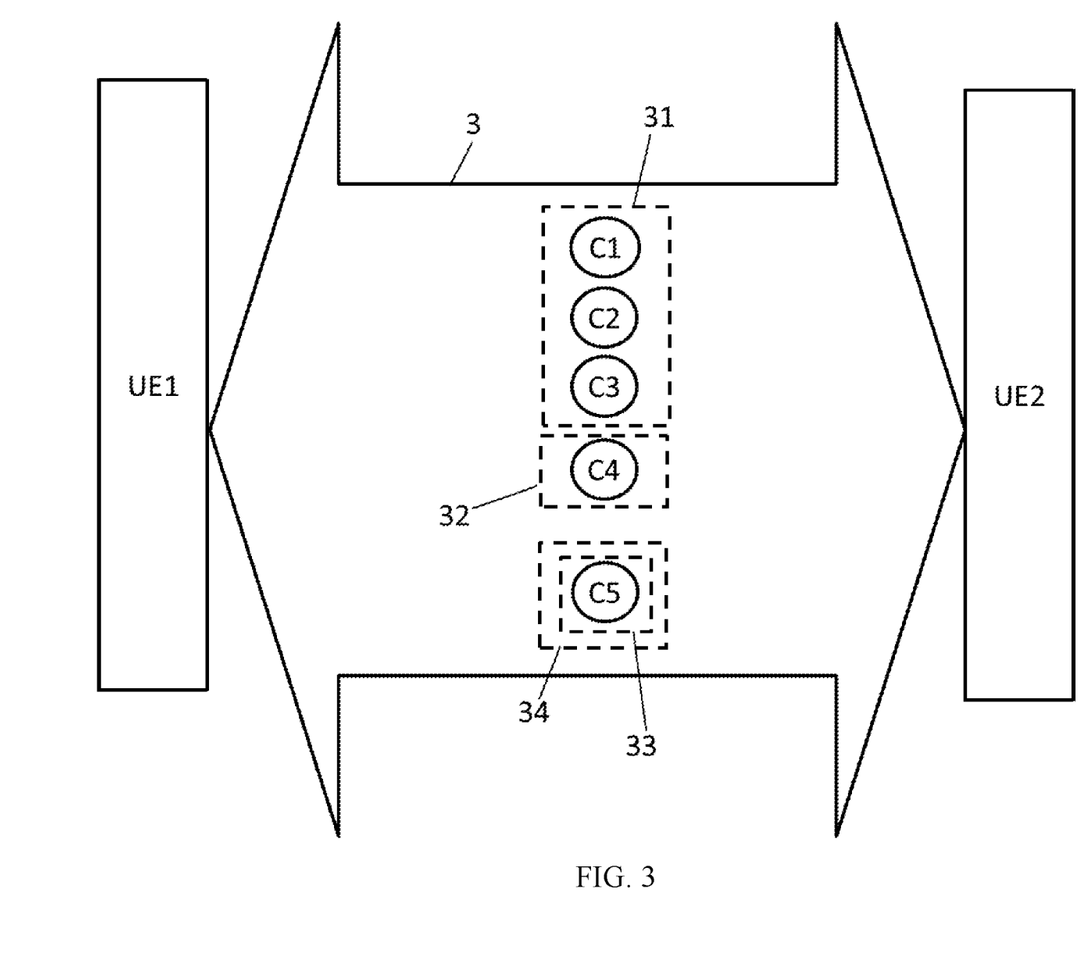
FIG. 3 illustrates a sidelink connection in accordance with some embodiments of the subject application.

FIG. 3 illustrates a sidelink connection in accordance with some embodiments of the subject application.

Referring to FIG. 3, a sidelink connection 3 is established between UE 1 and UE 2 as shown in FIG. 1 or FIG. 2. The sidelink connection 3 includes carriers C1, C2, C3, C4 and C5. Although merely carriers C1, C2, C3, C4 and C5 illustrated in FIG. 3 for simplicity, it is contemplated that sidelink connection 3 may include more or less carrier(s) in some other embodiments of the subject application. In other words, carriers C1, C2, C3, C4 and C5 are used in the sidelink connection 3 between UE 1 and UE 2.

In NR V2X, there exists service-to-carrier mapping relationship on sidelink, which means that one V2X service can be mapped to one or multiple carriers, and one carrier can be mapped to one or multiple V2X services. The service between UEs may include radio bearer related configuration. The V2X service between UEs may further include Quality of Service (QoS) related configuration. The V2X service between UEs may further include radio resource related configuration. The V2X service between UEs may include at least one of radio bearer related configuration, QoS related configuration or radio resource related configuration, and the combinations thereof. The types of the V2X services are not limited here, which can be selected according to practical requirements.

For example, service 31 may be mapped to carriers C1, C2 and C3 on the sidelink connection 3. In other words, carriers C1, C2 and C3 are configured for service 31. Carrier C4 is configured for service 32. Carrier C5 is configured for service 33 and service 34.

Figure 4:
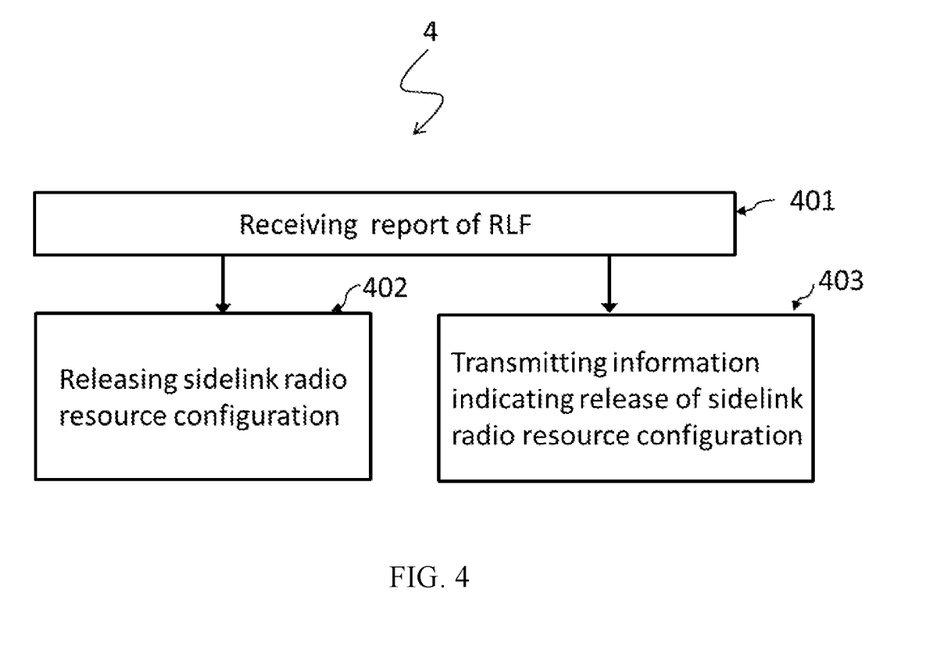
FIG. 4 illustrates a method of handling radio link failure in accordance with some embodiments of the subject application.

FIG. 4 illustrates a method 4 of handling radio link failure (or RLF) in accordance with some embodiments of the subject application. The method 4 may be used to handle RLF in the wireless communication 1 as shown in FIG. 1.

Referring back to FIG. 1, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3). Once RLF is detected or declared, UE 1 may transmit or send a report of RLF to BS. Once RLF is detected or declared, UE 1 may transmit or send a report of RLF to UE2. Once RLF is detected or declared, UE 1 may transmit or send a report of RLF to an upper layer of UE2. Once RLF is detected or declared, UE 1 may transmit or send a report of RLF to an upper layer of UE 1.

The RLF may be determined, declared or detected by UE 1 if a carrier of sidelink connection between UE 1 and UE 2 fails. For example, the RLF may be determined, declared or detected by UE 1 upon receiving an expiry message on a carrier of sidelink connection between UE 1 and UE 2. The expiry message may be generated by a timer in a lower layer of UE 1, (e.g. a physical layer, or other suitable layer(s)). For example, in the physical layer of UE 1, a timer is started upon receiving an "out-of-sync" indication for a sidelink carrier, if a number of consecutive "out-of-sync" indications reaches or exceeds a predetermined value (or a threshold), the sidelink carrier is determined, declared or detected fails. If an "in-sync" indication for the sidelink carrier is received before the number of consecutive "in-sync" indications reaches or exceeds the threshold, the timer is stopped.

The RLF may be determined, declared or detected by UE 1 based on an amount of retransmissions of a carrier of sidelink connection between UE 1 and UE 2. For example, if the amount of retransmissions of the sidelink carrier reaches or exceeds a predetermined value (or a threshold), the sidelink carrier is determined, declared or detected fails.

Referring back to FIG. 3, the report of RLF may include a sidelink connection identifier (ID) of a sidelink communication, for example, the sidelink connection 3 may have an ID. The RLF report may include an ID of a UE, for example, an ID of UE 1. The RLF report may include an ID of a UE, for example, an ID of UE 2. The report may include a carrier index, for example, a carrier index of each of carriers C1, C2, C3, C4 or C5 as shown in FIG. 3. The RLF report may include a V2X service ID, for example, a V2X service ID of each of service 31, service 32, service 33 and service 34.

The RLF report may also include at least one of the following information: a sidelink connection identifier (ID) of a sidelink communication, an ID of a transmitter UE, an ID of a receiver UE, a carrier index, a V2X service ID, or other parameter(s).

The RLF may be determined, declared or detected by UE 1 if all the carriers of a sidelink connection fail. For example, if all the carriers C1-C5 of the sidelink connection 3, which have a same sidelink connection ID, fail, the RLF is determined or declared. The RLF report may include information indicating all the carriers C1-C5 having a same sidelink connection ID fail.

The RLF may be determined, declared or detected by UE 1 if all the carriers for a service on the sidelink connection 3 fail. For example, if carriers C1-C3 (which have a same V2X service ID for service 31) fail, the RLF is determined, declared or detected. For example, if carrier C4 (which has a V2X service ID for service 32) fails, the RLF is determined, declared or detected. For example, if carrier C5 (which has two different V2X service IDs for service 33 and service 34, respectively) fails, the RLF is determined, declared or detected. In other words, if a service on a sidelink connection fails, an RLF is determined, declared or detected.

The RLF report may include information indicating a service (e.g. service 31) fails. In this scenario, carriers C1, C2 and C3 fail but carriers C4 and C5 are still good. BS, UE 1 or UE 2 can reconfigure resource pool or re-schedule data to carrier C4, carrier C5 or both for service 31.

In some embodiments of the present disclosure, the RLF of the sidelink communication is determined by the receiver UE upon one of the multiple carriers, which has a sidelink connection ID for the sidelink communication, fails. The RLF report may include information indicating one of the multiple carriers, which has a sidelink connection ID for the sidelink communication, fails.

In some embodiments of the disclosure, one V2X UE may have sidelink connection with different UEs. For example, as shown in FIG. 1 or FIG. 2, UE 1 has unicast connection with UE 2, UE 1 has unicast connection with UE 6, and UE 2 has unicast connection with UE 6 at the same time. The RLF of unicast connection between UE 1 and UE 2 does not impact the unicast connection between UE 1 and UE 6 and the unicast connection between UE 2 and UE 6. The RLF of unicast connection between UE 1 and UE 6 does not impact the unicast connection between UE 1 and UE 2 and the unicast connection between UE 2 and UE 6. The RLF of unicast connection between UE 2 and UE 3 does not impact the unicast connection between UE 1 and UE 6 and the unicast connection between UE 1 and UE 2. That is, the RLF of unicast connection between any two UEs do not impact the unicast connection between any other UEs. The sidelink connection between UEs is not limited in FIG. 1 or FIG. 2, it is contemplated that one of multiple sidelink connection can be established between any UE and other UEs in other embodiments of the disclosure.

Referring to FIG. 4, in operation 401, BS receives a report of RLF from UE 1.

BS may release sidelink radio resource configuration in operation 402 to establish another sidelink connection or a new sidelink connection between UE 1 and UE 2.

Alternatively, BS may transmit information which indicates release of sidelink radio resource configuration to UE 2 in operation 403. After receiving the information indicating release of sidelink radio resource configuration, UE 2 may release sidelink radio resource configuration to establish another sidelink connection or a new sidelink connection between UE 1 and UE 2.

In some embodiments of the disclosure, the sidelink radio resource configuration may include radio configuration. The sidelink radio resource configuration may further include unicast connection. The sidelink radio resource configuration may include at least one of radio configuration or unicast connection.

Figure 5:
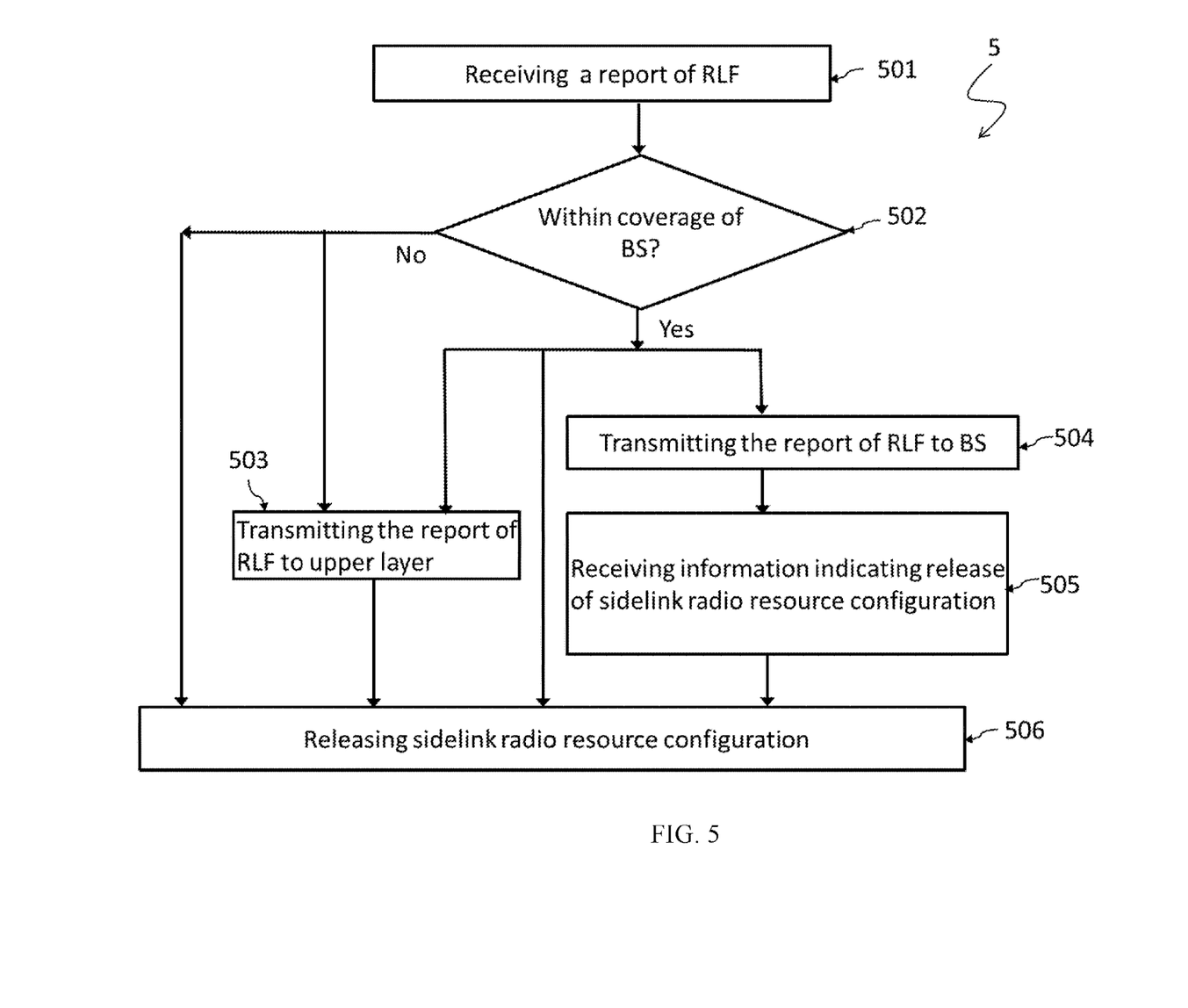
FIG. 5 illustrates another method of handling radio link failure in accordance with some embodiments of the subject application.

FIG. 5 illustrates another method of handling radio link failure in accordance with some embodiments of the subject application. The method 5 may be used to handle RLF in the wireless communication 1 as shown in FIG. 1. The method 5 may be used to handle RLF in the wireless communication 2 as shown in FIG. 2.

Referring back to FIG. 1, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3). Once RLF is detected or declared, UE 1 may transmit or send a report of RLF to UE 2.

Referring to FIG. 5, in operation 501, UE 2 receives a report of RLF.

If UE 2 is determined within coverage of BS, as shown in FIG. 1, in operation 502, UE 2 may release sidelink radio resource configuration to establish another sidelink connection or a new sidelink connection between UE 1 and UE 2 in operation 506.

Alternatively, if UE 2 is determined within coverage of BS in operation 502, UE 2 may transmit the report of RLF to BS in operation 504. BS may transmit or send information which indicates release of sidelink radio resource configuration to UE 2. After receiving information indicating release of sidelink radio resource configuration from BS in operation 505, UE 2 may release sidelink radio resource configuration to establish another sidelink connection or a new sidelink connection between UE 1 and UE 2 in operation 506.

Alternatively, if UE 2 is determined within coverage of BS in operation 502, UE 2 may transmit the report of RLF to an upper layer resided therein in operation 503. After receiving the report of RLF, the upper layer of UE 2 may release sidelink radio resource configuration to establish another sidelink connection or a new sidelink connection between UE 1 and UE 2 in operation 506.

A UE may include an upper layer. The upper layer is defined to differentiate from an AS layer and lower layers of the UE. The upper layer may include a Non-Access Stratum (NAS) layer. The upper layer may include a V2X layer. The upper layer may include an application layer. The upper layer may include at least one of the NAS layer, the V2X layer or the application layer. When the upper layer of UE 1 receives a report of RLF, the upper layer can indicate release of sidelink radio resource configuration. When the upper layer of UE 2 receives a report of RLF, the upper layer can indicate release of sidelink radio resource configuration In other words, no matter UE 1 and UE 2 are within coverage of the BS (e.g. in FIG. 1) or out of coverage of the BS (e.g. in FIG. 2), the upper layer can indicate to change service carrier, or release unicast connection after receiving the RLF report to establish another sidelink connection or a new sidelink connection between UE 1 and UE 2.

Referring back to FIG. 2, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3). Once RLF is detected or declared, UE 1 may transmit or send a report of RLF to UE 2.

Referring to FIG. 5, in operation 501, UE 2 receives a report of RLF.

If UE 2 is determined out of coverage of BS, as shown in FIG. 2, in operation 502, UE 2 may release sidelink radio resource configuration to establish another sidelink connection or a new sidelink connection between UE 1 and UE 2 in operation 506.

Alternatively, if UE 2 is determined out of coverage of BS in operation 502, UE 2 may transmit the report of RLF to an upper layer resided therein in operation 503. After receiving the report of RLF, the upper layer of UE 2 may release sidelink radio resource configuration to establish another sidelink connection or a new sidelink connection between UE 1 and UE 2 in operation 506.

Figure 6:
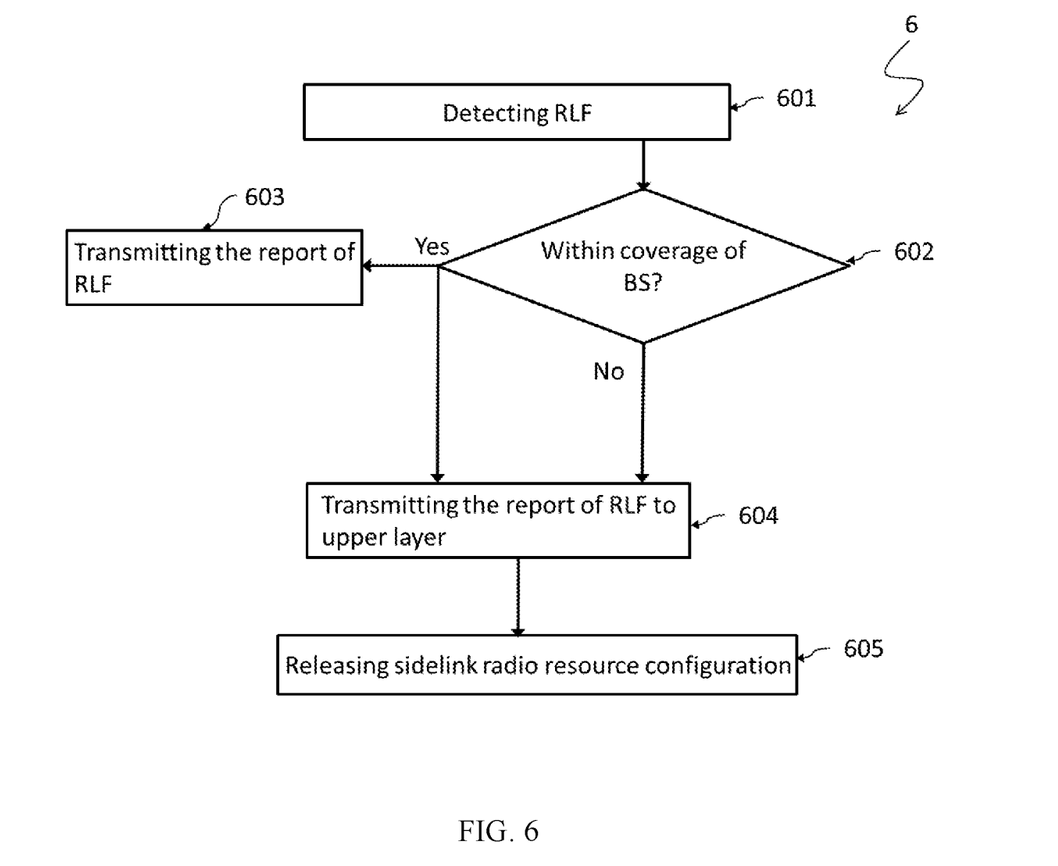
FIG. 6 illustrates another method of handling radio link failure in accordance with some embodiments of the subject application.

FIG. 6 illustrates another method of handling radio link failure in accordance with some embodiments of the subject application. The method 6 may be used to handle RLF in the wireless communication 1 as shown in FIG. 1. The method 6 may be used to handle RLF in the wireless communication 2 as shown in FIG. 2.

Referring back to FIG. 2, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3). Once RLF is detected or declared, UE 1 may transmit or send a report of RLF to UE 2.

Referring to FIG. 6, in operation 601, UE 1 detects RLF of sidelink connection between UE 1 and UE 2.

If UE 1 is determined out of coverage of BS, as is shown in FIG. 2, in operation 602, UE 1 may transmit a report of RLF to an upper layer resided therein in operation 604. After receiving the report of RLF, the upper layer of UE 1 may release sidelink radio resource configuration to establish another sidelink connection or a new sidelink connection between UE 1 and UE 2 in operation 605.

Referring back to FIG. 1, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3). Once RLF is detected or declared, UE 1 may transmit or send a report of RLF to UE 2.

Referring to FIG. 6, in operation 601, UE 1 detects RLF of sidelink connection between UE 1 and UE 2.

If UE 1 is determined within coverage of BS, as shown in FIG. 2, in operation 602, UE 1 may transmit the report of RLF to the upper layer resided therein in operation 604. After receiving the report of RLF, the upper layer of UE 1 may release sidelink radio resource configuration to establish another sidelink connection or a new sidelink connection between UE 1 and UE 2 in operation 605.

Alternatively, if UE 1 is determined within coverage of BS, as shown in FIG. 1, in operation 602, UE 1 may transmit the report of RLF to UE 2 or BS in operation 603. After receiving the report of RLF, UE 2 or BS may release sidelink radio resource configuration to establish another sidelink connection or a new sidelink connection between UE 1 and UE 2.

Figure 7:
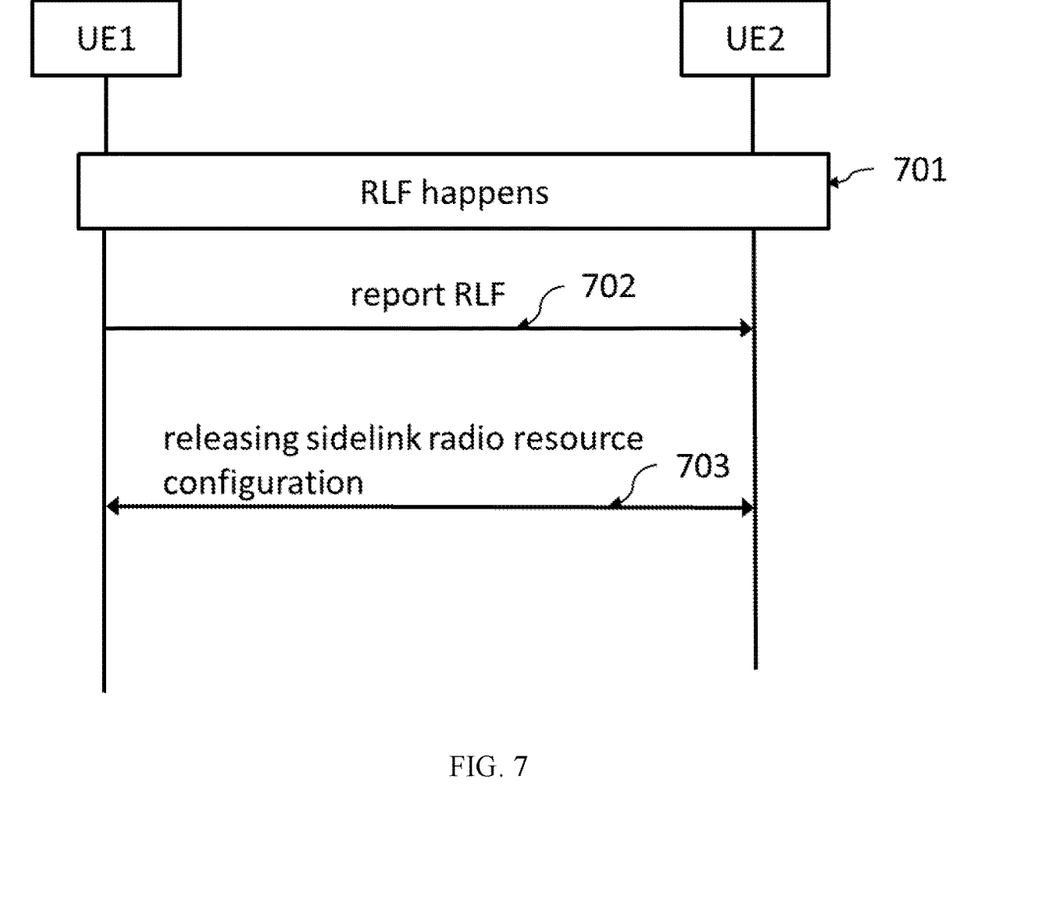
FIG. 7 illustrates signaling associated with interaction in a wireless communication system that involves sidelink communications in accordance with some embodiments of the subject application.

FIG. 7 illustrates signaling associated with interaction in a wireless communication system that involves sidelink communications in accordance with some embodiments of the subject application. The interaction may be used to handle RLF in the wireless communication 2 as shown in FIG. 2.

Referring back to FIG. 2, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3).

Once RLF happens or occurs on the sidelink connection between UE 1 and UE 2 in operation 701, UE 1 may transmit or send a report of RLF to UE 2 in operation 702. As UE 1 and UE 2 are determined out of the coverage of BS in FIG. 2, UE 2 may release sidelink radio resource configuration to establish another sidelink connection or a new sidelink connection between UE 1 and UE 2 in operation 703.

Alternatively, once RLF happens or occurs on the sidelink connection between UE 1 and UE 2 in operation 701, UE 1 may transmit or send a report of RLF to the upper layer resided therein in operation 702. As UE 1 and UE 2 is determined out of the coverage of BS in FIG. 2, the upper layer of UE 1 or UE 2 may release sidelink radio resource configuration to establish another sidelink connection or a new sidelink connection between UE 1 and UE 2 in operation 703.

Figure 8:
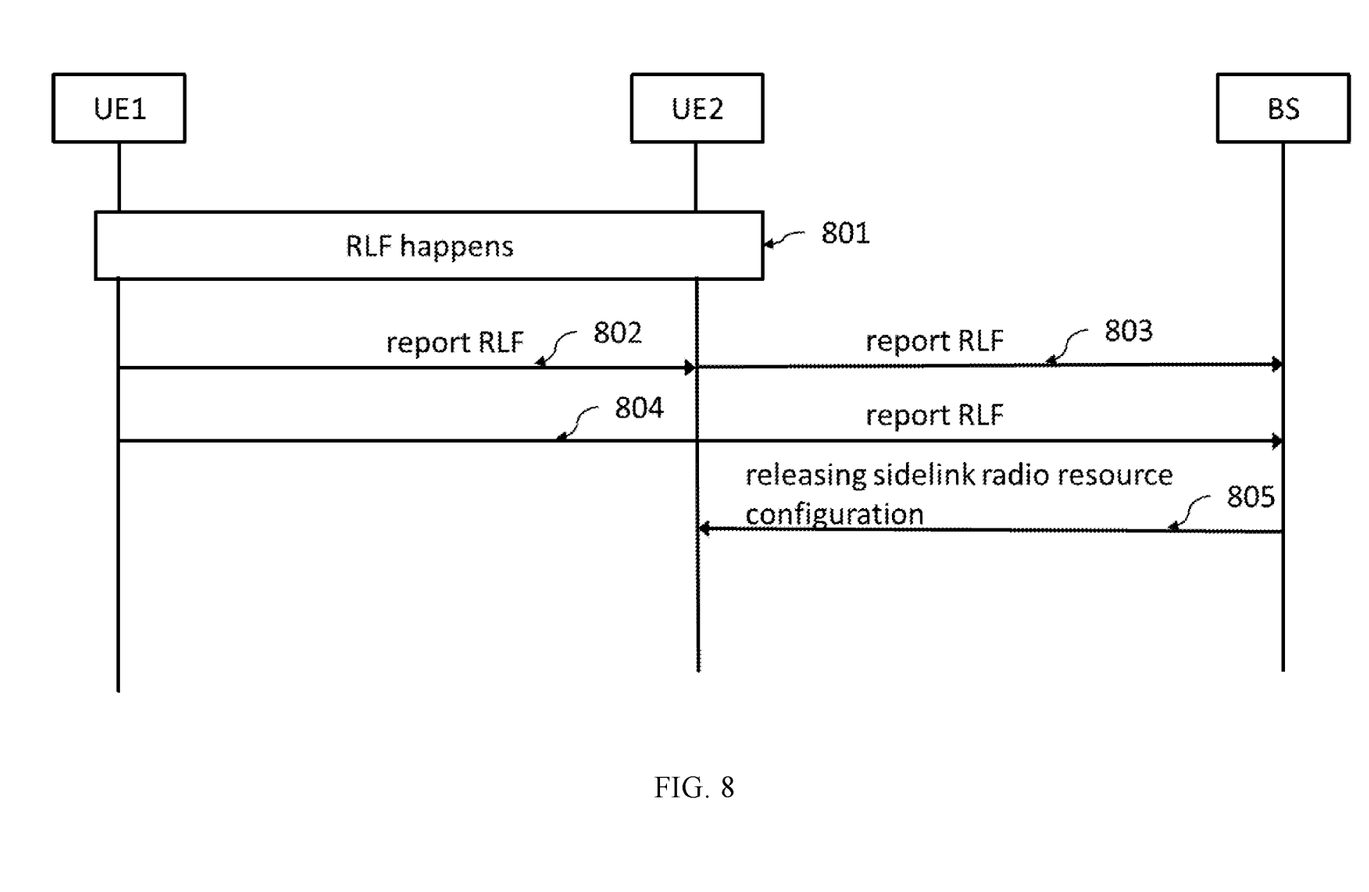
FIG. 8 illustrates signaling associated with interaction in a wireless communication system that involves sidelink communications in accordance with some other embodiments of the subject application.

FIG. 8 illustrates signaling associated with interaction in a wireless communication system that involves sidelink communications in accordance with some other embodiments of the subject application. The interaction may be used to handle RLF in the wireless communication 1 as shown in FIG. 1.

Referring back to FIG. 1, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3).

Once RLF happens or occurs on the sidelink connection between UE 1 and UE 2 in operation 801, UE 1 may transmit or send a report of RLF to UE 2 in operation 802, and UE 2 may transmit or send the report of RLF to BS in operation 803. UE 1 and UE 2 are determined within coverage of BS in FIG. 1, BS may release sidelink radio resource configuration to establish another sidelink connection or a new sidelink connection between UE 1 and UE 2 in operation 805.

Alternatively, once RLF happens or occurs on the sidelink connection between UE 1 and UE 2 in operation 801, UE 1 may transmit or send a report of RLF to BS in operation 804. UE 1 and UE 2 are determined within coverage of BS in FIG. 1, BS may release sidelink radio resource configuration to establish another sidelink connection or a new sidelink connection between UE 1 and UE 2 in operation 805.

Alternatively, once RLF happens or occurs on the sidelink connection between UE 1 and UE 2 in operation 801, UE 1 may transmit or send a report of RLF to BS in operation 804. UE 1 and UE 2 are determined within coverage of BS in FIG. 1, BS may indicate UE 2 to release sidelink radio resource configuration to establish another sidelink connection or a new sidelink connection between UE 1 and UE 2 in operation 805.

Alternatively, once RLF happens or occurs on the sidelink connection between UE 1 and UE 2 in operation 801, UE 1 may transmit or send a report of RLF to UE 2 in operation 802, and UE 2 may transmit or send the report of RLF to BS in operation 803. UE 1 and UE 2 are determined within coverage of BS in FIG. 1, BS may indicate UE 2 to release sidelink radio resource configuration to establish another sidelink connection or a new sidelink connection between UE 1 and UE 2 in operation 805.

Figure 9:
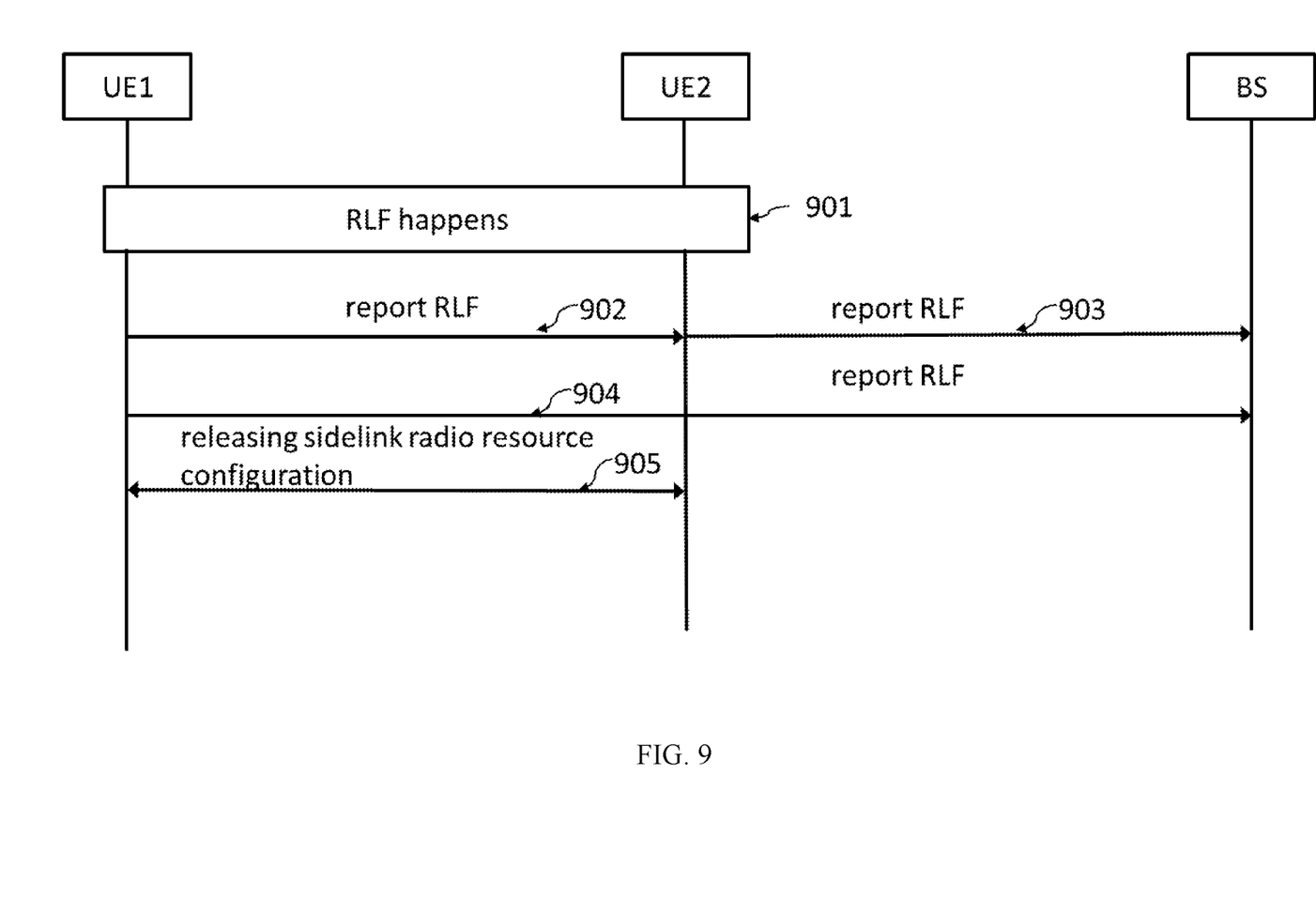
FIG. 9 illustrates signaling associated with interaction in a wireless communication system that involves sidelink communications in accordance with some other embodiments of the subject application.

FIG. 9 illustrates signaling associated with interaction in a wireless communication system that involves sidelink communications in accordance with some other embodiments of the subject application. The interaction may be used to handle RLF in the wireless communication 1 as shown in FIG. 1.

Referring back to FIG. 1, assuming UE 1 may function as a receiver UE and UE 2 may function as a transmitter UE during sidelink communication between UE 1 and UE 2. UE 1, as a receiver UE, monitors sidelink connection between UE 1 and UE 2 (e.g. sidelink connection 3 as shown in FIG. 3).

Once RLF happens or occurs on the sidelink connection between UE 1 and UE 2 in operation 901, UE 1 may transmit or send a report of RLF to UE 2 in operation 902, and UE 2 may transmit or send the report of RLF to BS in operation 903. UE 1 and UE 2 are determined within coverage of BS in FIG. 1, UE 2 may release sidelink radio resource configuration to establish another sidelink connection or a new sidelink connection between UE 1 and UE 2 in operation 905.

Alternatively, once RLF happens or occurs on the sidelink connection between UE 1 and UE 2 in operation 901, UE 1 may transmit or send a report of RLF to BS in operation 904. UE 1 and UE 2 are determined within coverage of BS in FIG. 1, UE 2 may release sidelink radio resource configuration to establish another sidelink connection or a new sidelink connection between UE 1 and UE 2 in operation 905.

Alternatively, once RLF happens or occurs on the sidelink connection between UE 1 and UE 2 in operation 901, UE 1 may transmit or send a report of RLF to the upper layer resided therein in operation 902. Although UE 1 and UE 2 are determined within coverage of BS in FIG. 1, the upper layer of UE 1 or UE 2 may release sidelink radio resource configuration to establish another sidelink connection or a new sidelink connection between UE 1 and UE 2 in operation 905.

Figure 10:
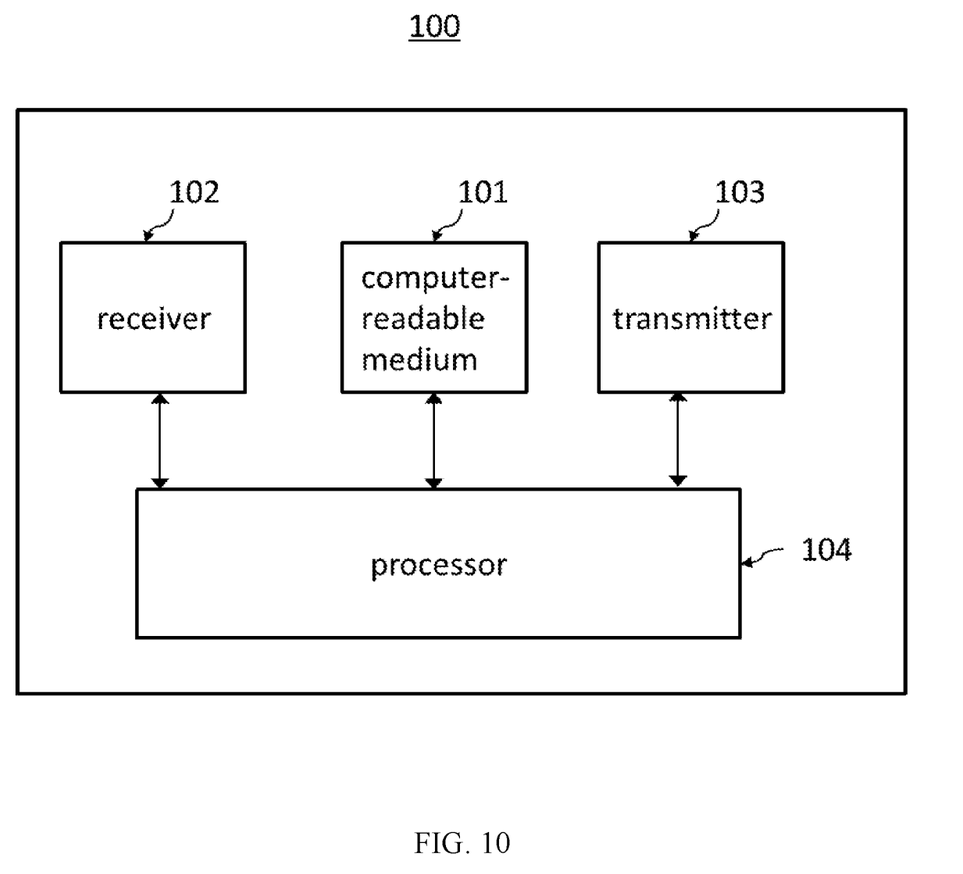
FIG. 10 illustrates an apparatus of handling radio link failure in accordance with some embodiments of the subject application.

FIG. 10 illustrates an apparatus of handling radio link failure in accordance with some embodiments of the subject application.

As shown in FIG. 10, the apparatus 100 may include a non-transitory computer-readable medium 101. The apparatus 100 may further include a receiver 102. The apparatus 100 may further include a transmitter 103. The apparatus 100 may further include a processer 104. The non-transitory computer-readable medium 101 has computer executable instructions stored therein. The processor 104 is configured to be coupled to the non-transitory computer readable medium 101. The processor 104 is configured to be coupled to the receiver 102. The processor 103 is configured to be coupled to the transmitter 103. It is contemplated that the apparatus 100 may include more computer-readable mediums, receiver, transmitter and processors in some other embodiments of the subject application according to practical requirements. In some embodiments, the apparatus 100 may be a BS. BS may operate, for example but is not limited to, based on the standard protocol of LTE, LTE-A, NR, or other suitable protocol(s). In some embodiments, the apparatus 100 may be a UE. UE may include, for example but is not limited to, a computing device, a wearable device, a mobile device, an IoT device, a vehicle having at least a transceiver, etc. In some embodiments, the receiver 102 and the transmitter 103 are integrated into a single device, such as a transceiver. In certain embodiments, the apparatus 100 may further include an input device, a memory, and/or other components.

In some embodiments, the non-transitory computer-readable medium may have stored thereon computer-executable instructions to cause a processor to implement the method with respect to BS as describe above. For example, the non-transitory computer-readable medium 101 and the computer executable instructions are configured, with the processor 104, cause the apparatus 100 to perform the operations with respect to the BS depicted in FIGS. 4-9.

In some embodiments, the non-transitory computer-readable medium may have stored thereon computer-executable instructions to cause a processor to implement the method with respect to UE 1 which be assumed to function as a receiver UE as describe above. For example, the non-transitory computer-readable medium 101 and the computer executable instructions are configured, with the processor 104, cause the apparatus 100 to perform the operations with respect to UE 1 depicted in FIGS. 4-9.

In some embodiments, the non-transitory computer-readable medium may have stored thereon computer-executable instructions to cause a processor to implement the method with respect to UE 2 which be assumed to function as a transmitter UE 2 as describe above. For example, the non-transitory computer-readable medium 101 and the computer executable instructions are configured, with the processor 104, cause the apparatus 100 to perform the operations with respect to UE 2 depicted in FIGS. 4-9.

In some embodiments, the apparatus may include PC5 interface. The method of RLM/RLF depicted in present disclosure may be applicable to the PC5 interfaces between the apparatuses, which is not limited here. The apparatus may be a vehicle. Persons skilled in the art should understand that as the technology develops and advances, the terminologies described in the present disclosure may change, and should not affect or limit principle and spirit in the present disclosure.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method comprising:
  receiving a report of radio link failure of a first sidelink communication between a first user equipment and a second user equipment;
  releasing a sidelink radio resource configuration; and
  discarding a new radio (NR) sidelink communication related configuration.

2. The method of claim 1, wherein the sidelink radio resource configuration comprises a radio configuration or a unicast connection.

3. The method of claim 1, wherein the first sidelink communication is performed over multiple carriers.

4. The method of claim 1, wherein the report includes: a sidelink connection identifier of the first sidelink communication, an identifier for the first user equipment, an identifier for the second user equipment, a carrier index, or a vehicle-to-everything service identifier, or some combination thereof.

5. The method of claim 1, wherein the radio link failure is determined by the first user equipment upon receiving an expiry message on a carrier for the first sidelink communication.

6. The method of claim 1, wherein the sidelink radio link failure is determined by the first user equipment upon an amount of retransmissions on a carrier for the first sidelink communication reaching a threshold.

7. The method of claim 3, wherein the report comprises information indicating all the carriers having a same sidelink connection identifier of the multiple carriers for the first sidelink communication fail.

8. The method of claim 3, wherein the report comprises information indicating all the carriers having a same vehicle-to-everything service identifier of the multiple carriers for the first sidelink communication fail.

9. The method of claim 3, wherein the report comprises information indicating one of the multiple carriers, which has a sidelink connection identifier for the first sidelink communication, fails.

10. The method of claim 1, further comprising transmitting the report of radio link failure if the first user equipment and the second user equipment are within coverage of a base station.

11. The method of claim 1, further comprising releasing the sidelink radio resource configuration if the first user equipment and the second user equipment are out of coverage of a base station.

12. A method comprising:
  detecting radio link failure of a first sidelink communication between a first user equipment and a second user equipment; and
  releasing a sidelink radio resource configuration; and
  discarding a new radio (NR) sidelink communication related configuration.

13. The method of claim 12, wherein the sidelink radio resource configuration comprises a radio configuration or a unicast connection.

14. The method of claim 12, wherein the first sidelink communication is performed over multiple carriers.

15. The method of claim 12, wherein the radio link failure is determined by the first user equipment upon receiving an expiry message on a carrier for the first sidelink communication.

16. The method of claim 12, wherein the radio link failure is determined by the first user equipment upon an amount of retransmissions on a carrier for the first sidelink communication reaching a threshold.

17. The method of claim 14, wherein the radio link failure of the first sidelink communication is determined by the first user equipment upon all the carriers having a same sidelink connection identifier for the first sidelink communication fail.

18. The method of claim 14, wherein the radio link failure of the first sidelink communication is determined by the first user equipment upon all the carriers having a same vehicle-to-everything service identifier for the first sidelink communication fail.

19. The method of claim 14, wherein the radio link failure of the first sidelink communication is determined by the first user equipment upon one of the multiple carriers, which has a sidelink connection identifier for the first sidelink communication, fails.

* * * * *